US008424355B2

(12) United States Patent
Boissin et al.

(10) Patent No.: US 8,424,355 B2
(45) Date of Patent: Apr. 23, 2013

(54) PRE-ROUNDING ELEMENT ON A ROUNDING APPARATUS

(75) Inventors: Guy Boissin, Fahrweid (CH); Oliver Schulthess, Uster (CH)

(73) Assignee: Soudronic AG, Bergdietikon (CH)

( * ) Notice: Subject to any disclaimer, the term of this patent is extended or adjusted under 35 U.S.C. 154(b) by 1020 days.

(21) Appl. No.: 12/425,663

(22) Filed: Apr. 17, 2009

(65) Prior Publication Data
US 2009/0263213 A1    Oct. 22, 2009

(30) Foreign Application Priority Data

Apr. 18, 2008  (CH) ........................................ 608/08

(51) Int. Cl.
*B21B 39/20*    (2006.01)
*B21B 37/72*    (2006.01)

(52) U.S. Cl.
USPC ................... 72/250; 72/166; 72/418; 72/11.5

(58) Field of Classification Search .................. 72/226, 72/227, 234, 250, 251, 166, 168, 169, 418, 72/428, 8.8, 11.5, 10.3
See application file for complete search history.

(56) References Cited

U.S. PATENT DOCUMENTS 1,990,579 A    2/1935  Adams et al.
4,998,871 A *  3/1991  Ledoux ...................... 72/370.23
5,209,625 A    5/1993  Stieger
8,157,494 B2 * 4/2012  Hug et al. ........................ 413/69

FOREIGN PATENT DOCUMENTS

| DE | 33 30 171 A1 | 2/1984 |
| EP | 1 197 272 A2 | 4/2002 |
| GB | 2 126 132 A | 3/1984 |
| WO | 2008144946 A1 | 12/2008 |

OTHER PUBLICATIONS

European Search Report of parallel EP 09 00 5351 application.

* cited by examiner

*Primary Examiner* — Dana Ross
*Assistant Examiner* — Pradeep C Battula
(74) *Attorney, Agent, or Firm* — McCormick, Paulding & Huber LLP

(57) ABSTRACT

A pre-rounding element (14) is used in a rounding apparatus (4) for rounding can body blanks from sheet metal blanks. The lower element part (22) of the pre-rounding element (14) is displaceable by an actuation element (23). This allows the adjustment of the pre-rounding element even during operation of the rounding apparatus. Preferably a measurement of sheet metal blank properties takes place. The measurement may include a thickness measurement and/or a strength measurement of blanks. The pre-rounding element is controlled in dependency of the measurement result. This allows a constant rounding result even with varying sheet metal properties.

12 Claims, 6 Drawing Sheets

PRE-ROUNDING ELEMENT ON A ROUNDING APPARATUS

CROSS REFERENCE TO RELATED APPLICATIONS

This application claims the priority of Swiss patent application No. 00608/08, filed Apr. 18, 2008, the disclosure of which is incorporated herein by reference in its entirety.

BACKGROUND OF THE INVENTION

The invention relates to a pre-rounding element on a rounding apparatus, further to a rounding apparatus, to a welding device for can bodies including such a rounding apparatus, as well as to a method for rounding single sheet metal blanks to container body blanks and to a method for making can bodies from single sheet metal blanks.

PRIOR ART

It is known to use a rounding apparatus for the making of container bodies and in particular can bodies from sheet metal. After the rounding the so produced container body blanks are directly transported into a welding machine for welding of the seam of the container body. The de-stacker of the sheet metal blanks, the rounding apparatus and the welding machine can be arranged as one production line. Such production lines for the making of can bodies are for example known from DE-A-33 30 171 or from U.S. Pat. No. 5,209,625. The rounding is done in such a manner that the can body blank is fed directly into the so called Z-rail defining the overlap of the edges of the rounded blank. For the rounding, rectangular cut sheet metal blanks with defined dimensions and standardised properties of the metal sheets are pushed by a feeder into a first pair of driven transport rollers and are then transported by several driven transport rollers with a speed of 100 to 450 meters per minute and bent in a rounding apparatus with a rounding system with wedges and rollers or with a roller system to a round body. In particular a pre-rounding wedge is used in front of the rounding rollers, which influences the result of the rounding procedure. In front of the rounding station there may be provided a wedge-system of an optional flexing station providing a plastic deformation of the blank that serves for removing tensions of the sheet metal blank before the rounding process. Such rounding apparatus or rounding devices, respectively, are known to the skilled person. The sheet metal blanks used for series production have different thickness and properties as for example elastic limit, stress-strain characteristic and strain hardening properties, which after the rounding process lead to different body radii depending on the qualities of the sheet metal which in turn lead to different gaps between the free edges. Thus not all rounded bodies of the production series lie in the same position within the rounding station and are exhibiting different rounding radii and this may lead to a variation of the size of the edge overlap in the welding station which leads to problems during welding, or may lead to problems already when the bodies are laterally pushed out from the rounding station into the welding station. This may lead on the other hand to a machine stop with considerable down-times. The efficiency of the production line is thus reduced and down-time costs occur.

According to the prior art the adjustment of the pre-rounding wedge is done manually and depends on the mentioned sheet metal properties such as the elastic limit and sheet thickness as well as from the size of the sheet metal blanks. If production is run with different sheet metal qualities it is necessary to adjust the pre-rounding wedge each time while the rounding apparatus is stopped.

To avoid these problems during rounding and welding of can bodies it is known to use sheet metal blanks with only little variations of the sheet metal properties coming from a single production charge of the sheet metal maker. It is taken care that sheet metal with different properties is not mixed-up. The rounding result is checked often and the rounding system and in particular the pre-rounding wedge is readjusted, which is done when the machine is stopped. But this reduces the efficiency of the production line.

BRIEF SUMMARY OF THE INVENTION

It is an object of the present invention to overcome these drawbacks.

Now, in order to implement these and still further objects of the invention, which will become more readily apparent as the description proceeds, a pre-rounding element having an essentially rigid upper element with fixation elements, and hinged lower element controlled in displacement by an actuating element is provided that allows changing the pressurization by the pre-rounding element of the sheet metal blank to be rounded during the actual operation of the rounding apparatus.

Preferably, the pre-rounding element, in particular a pre-rounding wedge, is provided with a solid flexure hinge, resulting in a simple construction. The solid flexure hinge works without unwanted play and free from wear. It is preferred that the pre-rounding element is provided with an electrically controllable actuation-element, resulting in a simple control and a low reaction time for changing the pressurization on the sheet metal blank.

The pre-rounding element can be controlled by an input value or by a preset value of the control device of the rounding apparatus, so that an adaptation to different sheet metal properties can be done by the worker controlling the rounding apparatus, or that for example a preset value for the setting of the pre-rounding element can be called up by the input of sheet metal blank properties such as blank size and/or blank thickness. It is preferred on the other hand that a measuring value of a sheet metal property serves for setting the pre-rounding element. It is particularly preferred that a property of the blanks is measured during rounding operation and that the pre-rounding element is set during operation of the rounding apparatus according to the measured property.

With a rounding apparatus according to the invention and a welding device according to the invention and with the method of rounding and the method of welding, respectively, such a pre-rounding element is used. It is provided in particular at least one measuring device for measuring at least one sheet metal property so that a measurement value or a value derived from this measurement value is given to a control of the rounding apparatus for controlling the pre-rounding element of the rounding apparatus in dependency of the measurement value or the value that is derived from the measurement value. This results in a rounding radius that remains essentially constant despite sheet metal property changes.

In a preferred method or device, respectively, the measurement is made during the rounding operation and without sheet metal blank destruction on consecutive sheet metal blanks, so that measurement takes place during production and the pre-rounding is set during production. The rounding is made during the production of can bodies, and in particular with a rounding speed of 100 to 450 meters per minute, and the rounded can body blanks are fed from the rounding apparatus to a welding device for can body blanks, provided with a Z-rail for positioning the edges to be welded and provided with welding rollers, and in particular with wire electrodes running on the welding rollers. The thickness of the sheet metal blank is an example for the sheet metal property that is measured.

But preferably, the sheet metal property that is measured is directly the rounding characteristic or the elastic limit, respectively, so that a direct value for the rounding property of a blank or even of each blank is provided. This can preferably be done by executing a partial pre-rounding in the feed path to the rounding apparatus or within the rounding apparatus itself. In particular, this can be provided within the flexing station and in particular the rounding property will be determined electrically and/or mechanically and/or optically and/or acoustically.

BRIEF DESCRIPTION OF THE DRAWINGS

The invention will be better understood and objects other than those set forth above will become apparent when consideration is given to the dependent claims and to the following detailed description of preferred embodiments. Such description makes reference to the annexed drawings, wherein

DESCRIPTION OF PREFERRED EMBODIMENTS

Figure 1:
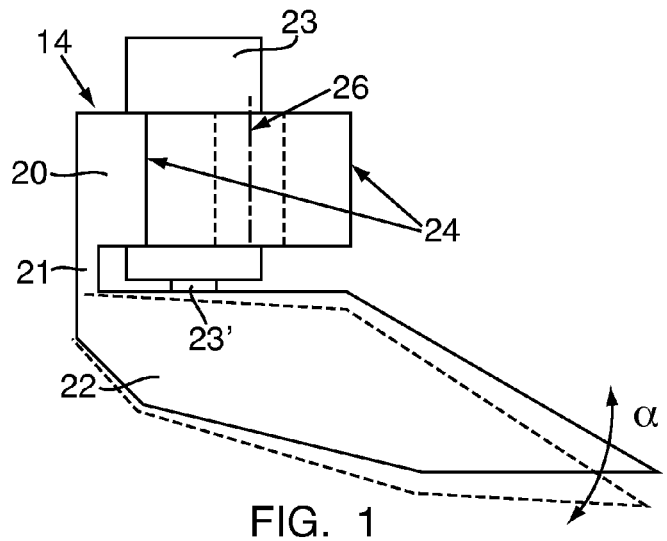
FIG. 1 shows a side-view of an embodiment of a pre-rounding element according to the invention.
Figure 2:
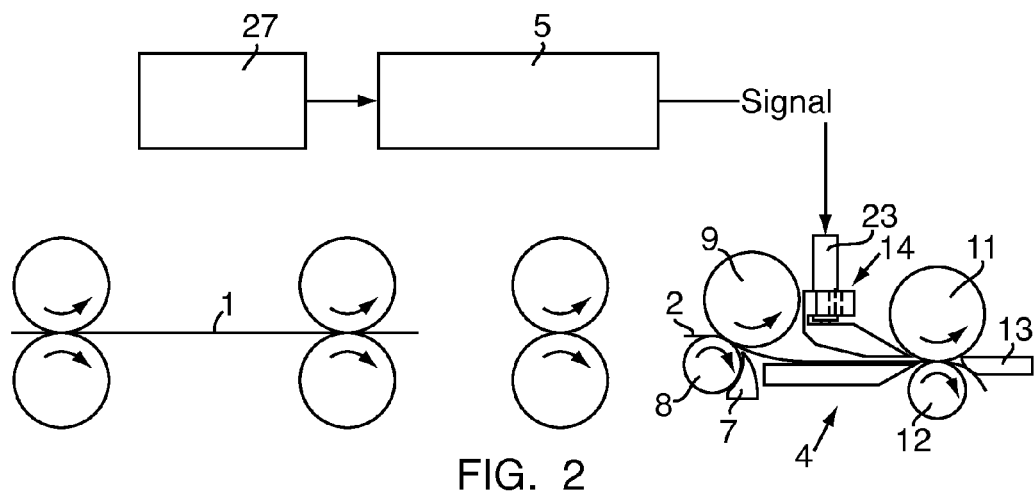
FIG. 2 shows schematically the arrangement of a pre-rounding element according to the invention within a rounding apparatus.
Figure 3:
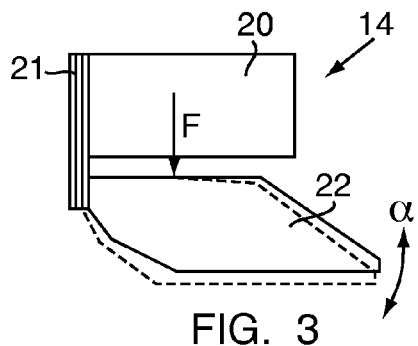
FIGS. 3 to 11 show schematically other embodiments of pre-rounding elements.

FIG. 1 shows a side view of an embodiment of a pre-rounding element 14 according to the invention. The pressurization of a sheet metal blank within a rounding apparatus by such a pre-rounding element 14 is schematically shown in FIG. 2. A more detailed description of a rounding apparatus with a pre-rounding element and with measurement of sheet metal blank properties is given with respect to FIGS. 12 to 16.

The pre-rounding element 14 is in the shown embodiment a wedge-shaped pre-rounding element or a pre-rounding wedge, respectively, since its lower part 22 which acts on the sheet metal blank has a wedge-shape. The acting on the sheet metal blank by the pre-rounding wedge leads to a pressure acting on the blank and is thus here called "pressurization". The pre-rounding element comprises a rigid, fixedly mounted upper part 20. In this embodiment part 20 is a part adapted to be mounted on a machine part of the rounding apparatus and is provided in the shown example with a bore 26 and guides 24 allowing fixation to the rounding apparatus and as well providing for an adjustment in vertical direction. Thus a basic adjustment can be made when mounting the pre-rounding element to the rounding apparatus. The fixed upper part 20 may as well be a rigid part of the rounding apparatus itself.

The movable lower part 22 or wedge 22, respectively, of the pre-rounding element 14 is connected to the fixed upper part 20 by a joint or hinge, respectively, which allows the movement or displacement, respectively, of the lower part 22, relative to the fixed upper part. This movement or displacement is shown by arrow a. The movement or displacement, respectively, is provided by an actuation element 23, which is also called an actor. The actor has a non-moving upper part which is fixed at the upper part 20 of the element 14 and the movable part 23' of the actor acts on the displaceable wedge-shaped lower part 22 of the pre-rounding element 14. Thus if the movable part 23' acts with a force in downward direction (when the downward direction is defined as seen in the Figure) the movable wedge-shaped part 22 is moved or displaced, respectively, so that it will assume in its maximum bent position the position shown by the dotted line. If on the other hand the movable part 23' of the actor 23 is in its rest position (exerting no force on the wedge) the wedge-shaped part 22 is in the rest position shown by the full line. Depending on the force with which the actor acts on the wedge-shaped part 22 a position between the two shown positions results. The joint or hinge 21, respectively, which connects the upper part 20 and the wedge 22 is in this case a flexible solid hinge consisting of a solid part with a dimension that allows deformation within its elastic range by the force of the actor 23. Accordingly a movement back towards the normal position (which is the position without a force acting on the hinge) results, when the force of the actuator is reduced. Such a hinge or joint 21 being in one-piece with the upper part 20 and the lower part 22 as shown in FIG. 1 is the preferred embodiment. The actor can be a controllable drive of any construction that allows deflection of the wedge. A known piezoelectric actor is the preferred actor since only small deflections of the wedge are necessary to act on the sheet metal blank and the quick response of a piezoelectric actor is an advantage. But other controllable drives such as electric motors, magnetic drives or a pneumatic or hydraulic drive may be used as actor 23.

FIG. 2 shows schematically the feeding of a sheet metal blank 1 towards a rounding apparatus 4 in which another sheet metal blank 2 is already being rounded. The sheet metal blanks have been de-stacked from a stack not shown here and are rounded while travelling through the rounding apparatus. The transport of a de-stacked blank into the rounding apparatus is provided by any kind of known transport elements, for example by the rollers shown. A flexing-station with flexing rollers 8 and 9 and with a flexing wedge 7 may be provided. Such flexing stations are known and on the one hand remove tensions from the blank which helps the following rounding process and on the other hand provide a rounding of the foremost edge of each blank which is helpful for a perfect rounding result. A measurement unit as will be explained later in detail may be present as part of the flexing station or may follow directly after the flexing station, in particular for measuring the rounding properties of each blank. Following the flexing station the actual rounding station 4 of the rounding apparatus is schematically shown. This rounding station 4 includes rounding rollers 11 and 12 and a rounding wedge 13 following in transport direction after the rounding rollers. These elements of a rounding apparatus are well known to the skilled person and are not explained here. In front of the rounding rollers 11, 12, the pre-rounding element 14 according to the invention is arranged and acts on the sheet metal blank to be rounded. This is done according to the invention by the displaceable lower part 22 of the pre-rounding element 14 during the rounding operation of the production line. Thus it becomes possible to act by the element 14 during the rounding operation individually on each single blank that travels through the rounding apparatus and the rounding result can be influenced for each single blank. The actor 23 is controlled in this respect by a signal from a control 5. This may be the control of the rounding apparatus or the control of a welding device for container bodies which includes the rounding apparatus. The control 5 may be as well a separate control which may work together with the mentioned controls. The setting of the pre-rounding element 14 via control 5 may be done by a operating person operating the rounding apparatus for example by selecting a specific displacement of the lower part 22 via control 5. This displacement is then used for all blanks until the operating person selects a different displacement. The displacement may also be selected by the control 5 from a number of stored displacement values. The operating person then only enters the sheet metal blank size and/or sheet metal blank thickness and/or a code value for the sheet metal to be rounded and the control selects the corresponding displacement of the lower part 22. In another and preferred embodiment a measurement of at least one sheet metal property is performed by a measurement device 27 and the measured value leads to a selection of the displacement of the lower part 22 by the control 5 via actor 23. The measurement is preferably done for each blank and thus the pre-rounding element is individually set for each blank of a series of blanks to be rounded. The measurement may as well take place for selected blanks, for example for the $10^{th}$ and the $20^{th}$ and the $30^{th}$ blank and so on or only for a single blank of a number of blanks, for example for the first blank of each stack of blanks that is to be rounded. As a measured value the thickness of the sheet metal may be measured. Thickness measurement devices for sheet metal are well known to the skilled person and are therefore not explained here in detail. But preferably the actual rounding property of the sheet metal is measured and used for controlling the pre-rounding element 14, which is explained in detail below.

Figure 4:
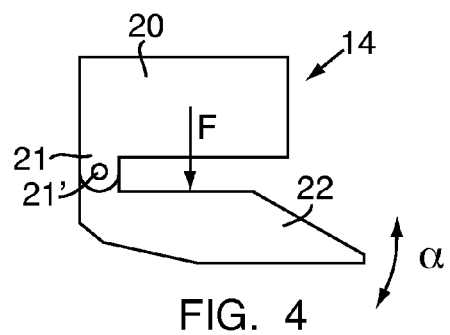
Figure 5:
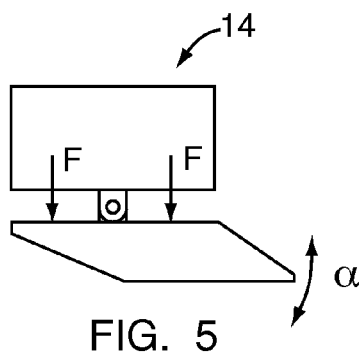
Figure 6:
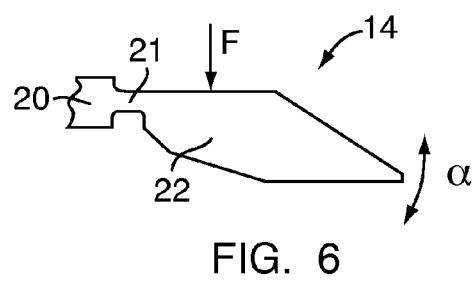
Figure 7:
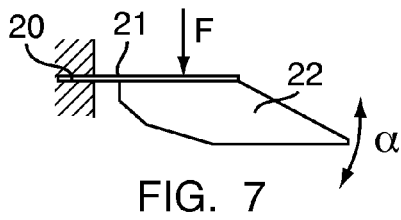
Figure 8:
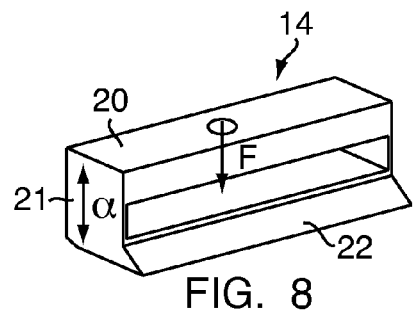
Figure 9:
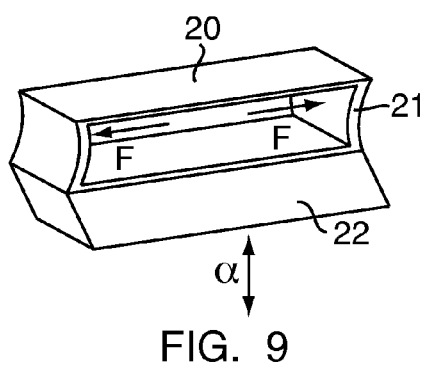
Figure 10:
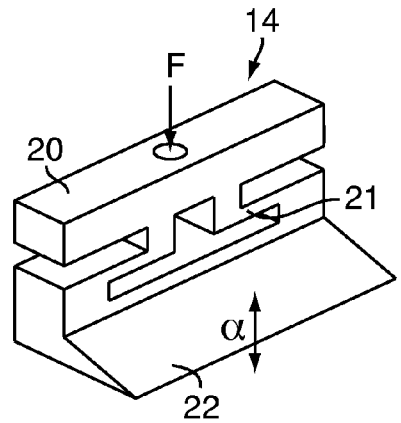
Figure 11:
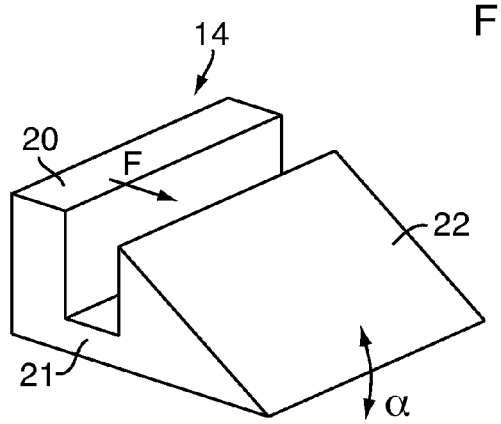

FIGS. 3 to 11 show other embodiments of the pre-rounding element 14. In these Figures the actor is not shown as an element but only the force F of the actor acting on the displaceable part of the pre-rounding element is represented by an arrow. According to FIG. 3 the pre-rounding element is shown with an elastically solid joint 21 provided by at least one leaf spring. As the solid joint of FIG. 1 it provides for an automatic movement back to the rest position when the force of the actor ends. FIG. 4 on the other hand shows a rotating joint 21 with a rotational axle 21'. In this case the movement back to the rest position has to be done by the actor or by another element not shown, for example a back movement spring or by the counter force of the sheet metal blank itself acting on the lower part 22. FIG. 5 shows an embodiment with a joint that allows for a rocker-like movement of the lower element 22 by the two forces F (and thus by two actors). FIG. 6 shows another solid joint 21 and shows the upper part 20 as a solid part of the rounding apparatus. This is shown as well in FIG. 7 where the joint or hinge, respectively, is provided by at least one leaf spring. The pre-rounding elements 14 of FIGS. 8 to 11 again are provided with one-piece solid joints working by elastic deformation of parts of the pre-rounding elements 14. The terms upper element and lower element have been used, but of course, depending on the construction of the rounding apparatus it is possible, that the lower part of the pre-rounding element is the fixed part and the upper part is the part that is displaced by the actor.

Figure 12:
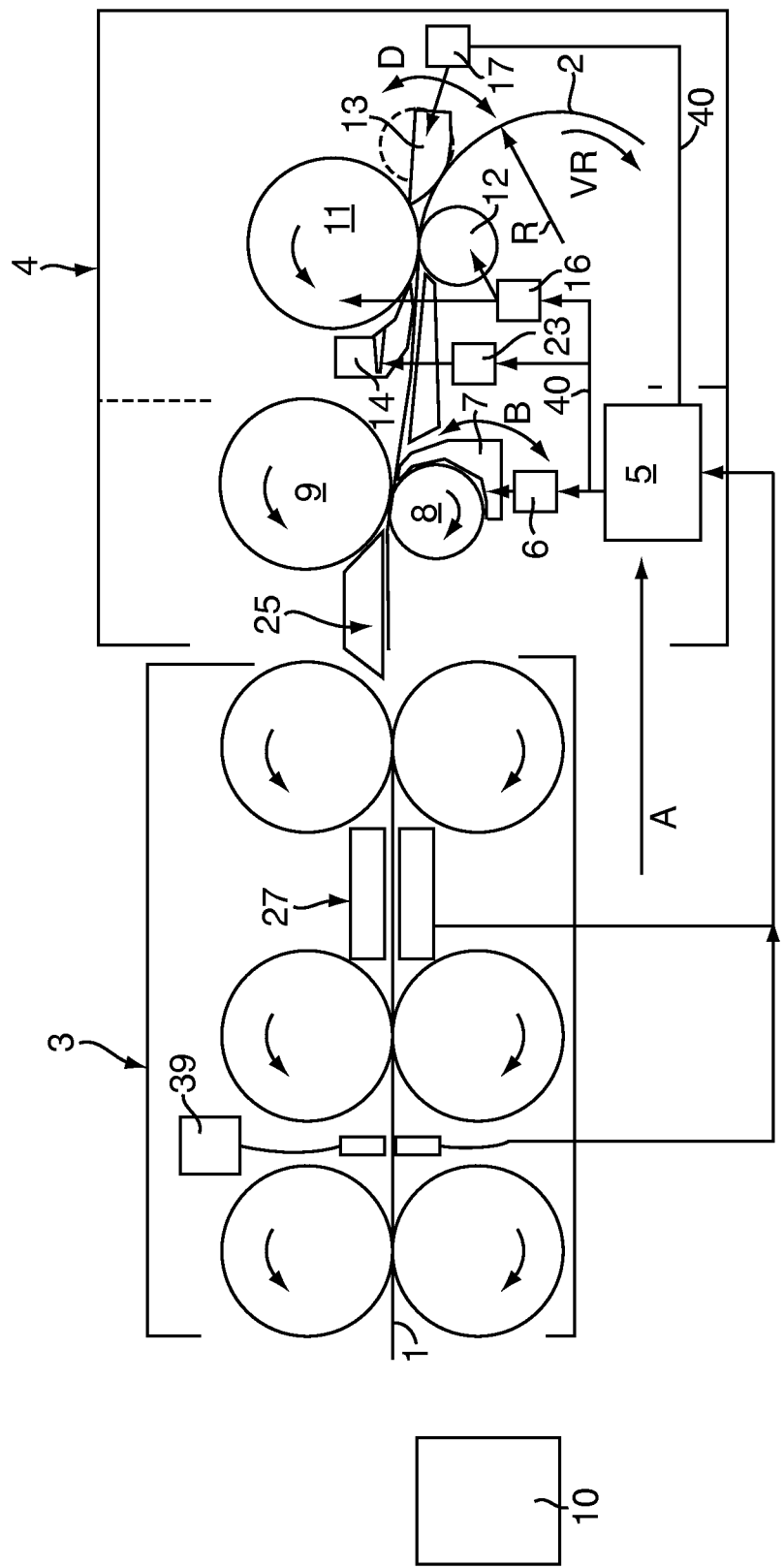
FIG. 12 shows schematically a device for explaining embodiments of the invention.
Figure 13:
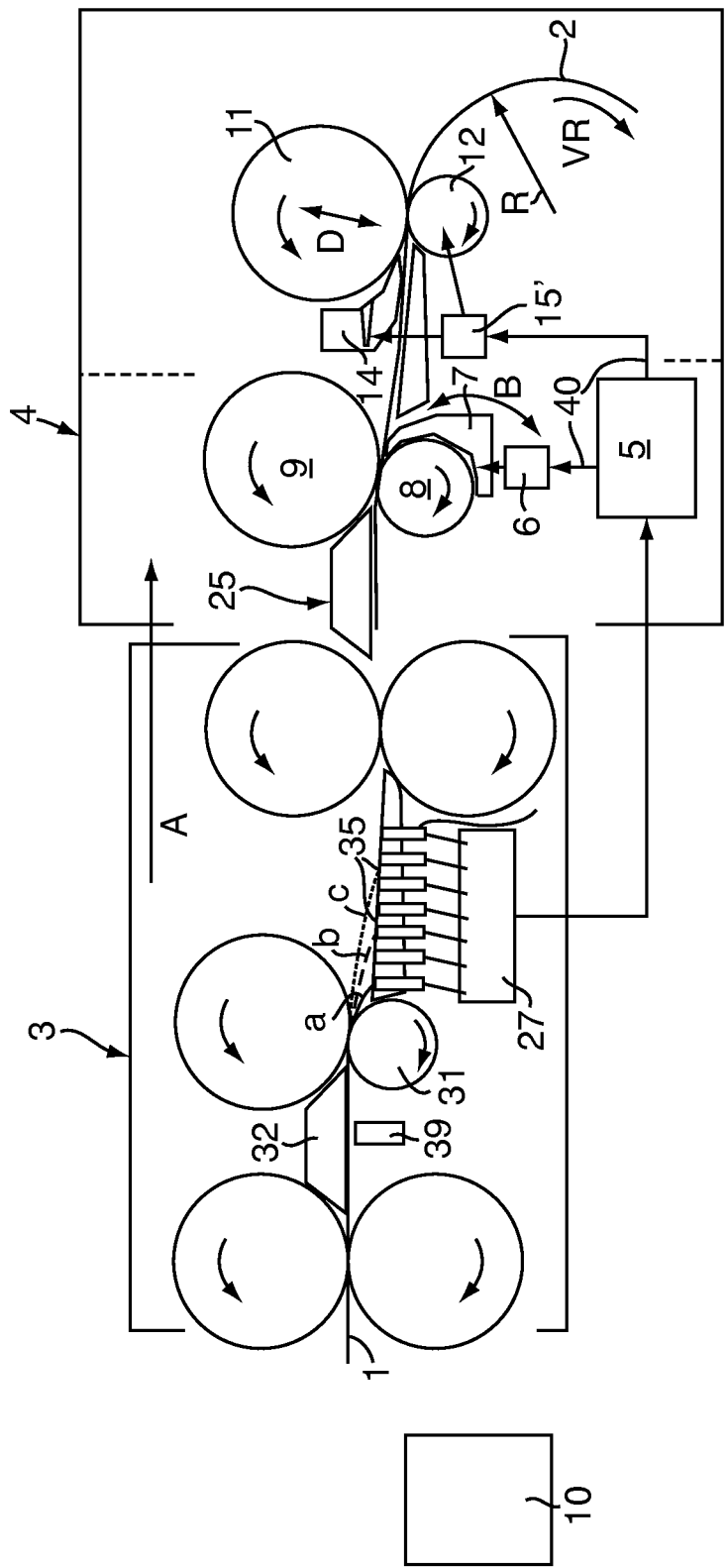
FIG. 13 shows another device.

FIGS. 12 and 13 schematically show different embodiments of the present invention wherein same reference numerals are used for the elements already explained. It can be seen, that sheet metal blanks, of which blanks 1 and 2 are shown as examples, are de-stacked from a stack 10 (by a known de-stacker not shown) and are fed to a transport device 3 which is used as a feeding element for a rounding apparatus 4 and provides a feeding section of a certain length. The blanks are transported through this arrangement of feeding element and rounding apparatus in direction of arrow A. The de-stacking and the feeding into the transport device 3 are not explained here in detail since this is known to the skilled person. Although preferred, the transport device 3 is only optional so that the blanks may be fed directly from the stack into the rounding apparatus. This makes it necessary though that the measurement device which is explained below is positioned at the entrance of the rounding apparatus or within the rounding apparatus, which will be shown as well. Such a positioning of the measurement device is of course as well possible if a transport device 3 is present. In the shown embodiment the transport device is provided with several pairs of rollers which transport each blank to the entrance 25 of the rounding apparatus 4. Such a transport may be done in other ways known to the skilled person than by the shown pairs of rollers. Within the rounding apparatus each blank is rounded to a body blank as can be seen for the front part (seen in transport direction) of blank 2. The rounding is done with a set target rounding radius that is given by the setting of the rounding apparatus and actually leads to a rounding radius R. The rounding is done for example with a rounding speed of 100 meters per minute up to 450 meters per minute. Different kinds of rounding apparatus are known and available, in particular as well for can bodies. A simple embodiment of a rounding apparatus may use two rounding rollers 11 and 12 as shown. Rounding apparatus with more than two rounding rollers are known as well, for example from EP-A-1 197 272. Such rounding apparatus and other known rounding apparatus can be used within the scope of the present invention as well. It is again shown that a pre-rounding element 14 is present in front of rounding rollers 11, 12, but this element 14 is shown in a simplified manner, but it is to be understood that the element 14 is one of the embodiments explained above. A rounding wedge 13 may be present behind rounding rollers 11, 12 as shown in FIG. 12, but such a rounding wedge may as well be omitted as shown in FIG. 13. It is further possible and even preferred that a flexing station is present in front of the actual rounding station, which flexing station is here part of the rounding apparatus but may as well be a separate station. In the example shown the flexing station comprises rollers 8 and 9 and the flexing wedge 7 acting on the blank exiting from rollers 8, 9. Flexing stations are generally known to the skilled person for removing tensions from the sheet metal and helping the following rounding, for example from U.S. Pat. No. 5,209,625 mentioned above, and are not explained further here; but the measurement device for detecting the rounding behaviour or properties, respectively, may be provided as well in the flexing station and the pre-rounding in the flexing station may be used for detecting the rounding behaviour of the sheet metal, as will be explained more in detail.

The adjustable elements of the rounding apparatus, and preferably as well of the flexing station, are preferably provided with drives (hereinafter called actors as well) which can move these elements within their usual adjustability ranges for allowing the control of the rounding apparatus to influence the rounding result; the influence of the actors on the elements of the rounding apparatus is symbolized in the Figures by arrows leaving the actors and pointing to the elements. The movement or displacement of the element is symbolized by another arrow and the connection of the actors with the control 5 is symbolized by lines 40. Thus the flexing wedge 7 can be moved by actor 6 in the directions of arrow B. The pre-rounding wedge is moved by actor 23 in the way already explained. For rollers 11 and 12 a drive may be provided that adjusts the distance between the rollers and which may act on both rollers or just on one of the rollers. This is shown schematically by the actor 16. Further, an actor 17 may be provided that acts on the rounding wedge 13 to move this rounding element as shown by arrow D. All of these actors may be provided in addition to actor 23 or none of these additional actors may be provided or only one of these actors and any combination thereof may be provided, thus allowing the control 5 of the rounding apparatus 4 to influence the rounding result and the rounding radius R, respectively, directly during operation of the apparatus by controlling the actors and thus the rollers and/or wedges. The design of the actual drives and their linkage to the rollers and wedges may vary according to the actual construction of the rounding apparatus, but can be easily adapted by the skilled person. The actors may work on a electric, pneumatic, hydraulic or piezoelectric basis, for moving the elements of the rounding apparatus. Such movement shall be attained during the operation of the apparatus so that a change of the rounding radius can be effected from one blank to the next or even during the rounding of one blank. The rounding apparatus may be operated in a basic operation mode first that corresponds to the expected general properties of the blanks of the stack 10 which leads to the rounding radius R that shall be attained as long as the blank properties are within the expected range. If the measured properties deviate from this range, as will be explained below, the control can activate at least one of the actors in dependency of the measurement value to adapt the rounding parameters to the measured blank properties, so that despite the deviation of the properties the rounding result with the target value of the rounding radius R is attained. If only one of the actors is present, and thus in this case only actor 23, which acts on the pre-rounding element 14, the control 5 can control this actor only and the control can be easily programmed by a few tests with sample blanks with different properties, so that for these properties the correct result is attained. If then during operation the measurement shows that a blank with a measured value that equals one of several stored values or lies within one of several stored ranges of measurement values, the control can react according to the test sample settings and set the pre-rounding element accordingly. It can be seen that by providing more than one actor and thus giving more than one possibility to the control to act against the deviation of the blank properties, the complexity of the program within control 5 rises, since for example, it has then to be decided whether a change in blank properties is countered for attaining the target value R by setting the pre-rounding element 14 by actor 23 only or additionally by actor 16 setting the distance of rounding rollers 11 and 12. This as well can be selected beforehand by running sample blanks through the rounding apparatus by the skilled person setting the apparatus up for operation and setting and/or programming controller 5. The same applies for the embodiment where the flexing wedge 7 can be displaced by an actor 6 as well. But since the effects on the rounding result by elements 7, 14, 11 and 12 and if the case may be 13, are already known to the skilled person for a rounding apparatus, this person can program the control 5 in such a way that the changes of the settings that this skilled person would have otherwise performed offline and manually in view of a certain rounding result are now done online during operation of the rounding apparatus by the control and the actors.

Figure 14:
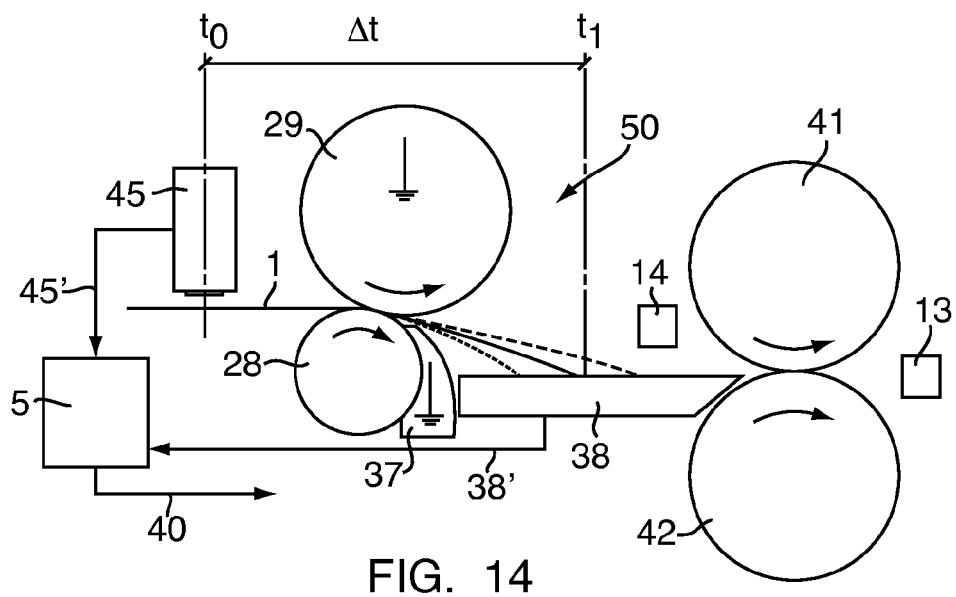
FIG. 14 shows a schematic view of a measurement device.
Figure 15:
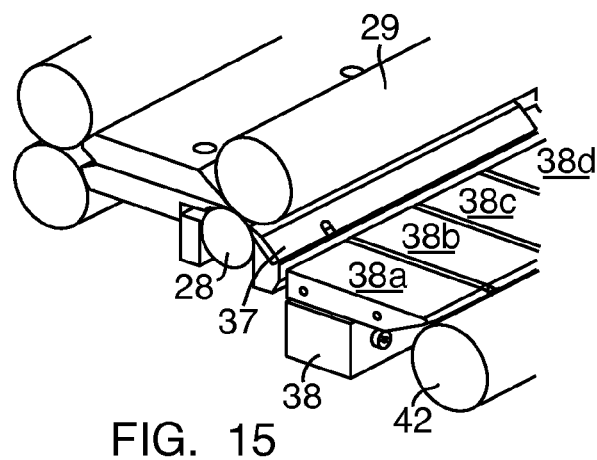
FIG. 15 shows a perspective partial view of the measurement device of FIG. 14.
Figure 16:
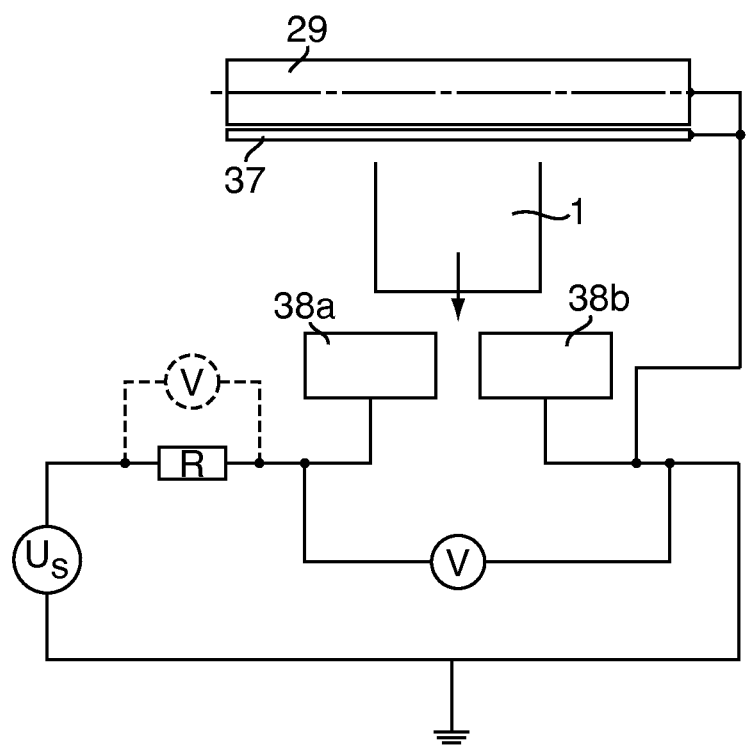
FIG. 16 shows the electrical circuit of the measurement device of FIGS. 14 and 15.

According to embodiments of the invention a measurement device for the sheet metal blanks is provided by which at least one sheet metal property of the sheet metal to be rounded can be evaluated, so that the apparatus can be set accordingly. The invention includes the possibility that at least one blank of the stack 10 is measured before the rounding operation on the blanks of this stack is started; this measurement may then include a measurement by which the blank is destroyed. Based on such a measurement value the apparatus 4 and in particular the pre-rounding element is then set. A measurement device measuring before the start of the rounding operation may preferably be connected to the control 5 over a data connection so that the control 5 receives the measurement value on the blank properties of the stack directly, so that actor 23, or if the case may be additional actors can be set. But the preferred embodiment is to provide the measurement during the rounding operation as explained below. In the shown embodiment of FIG. 12 the measurement of at least one sheet metal property is done in the feeding section to the rounding apparatus which is here provided by the transport device 3. If such a feeding section is missing so that the blank is fed directly from stack 10 into the entrance 25 of the rounding apparatus 4, then the measurement of the at least one sheet metal property is done either at the de-stacker and/or directly at the entrance of or within the rounding apparatus 4, in particular in the flexing station. Such an example is shown in FIGS. 14 to 16. It is as well a possibility to provide measurement devices at the blank slitter apparatus, which cuts large sheet metal pieces into the much smaller sized blanks. In such an embodiment it is possible to mark the blanks with a marking, for example a number code or a bar code, which represents the measured sheet metal blank properties, so that this code can be read in the feeding section 3 or at the entrance of the rounding apparatus, which informs the control 5 about the measurement value or values or values derived from the measured values. This again allows the setting of at least actor 23.

In the shown embodiment of FIG. 12 a measurement device 27 is shown which is arranged between pairs of rollers of the feeding section 3. This measurement device 27 is connected to the control 5, so that the measured value or a value derived therefrom standing for the blank property or properties is given to control 5. Preferably the measurement device allows the measurement of the strength of the blank within the measurement device. For example a measurement method is used that works without touching the blank. A known touch-less measurement device is used for steel bands and can here be used in a new manner for single blanks. This method is based on a periodical magnetization of the metal and the measurement of the gradient of the remaining magnetic field strength on the upper side and on the lower side of the band, but here on these sides of the blank instead. The measured value of the remaining magnetic field strength or the calculated gradient thereof, respectively, is related via correlation to the mechanical strength of the sheet metal, in particular to the tear strength and to the elastic limit of the sheet metal blank. Such a measurement device is known under the trademark IMPOC® and available on the market and is produced and sold by the company EMG Automation GmbH, Wenden, Germany. With such an measurement device the strength properties of the sheet metal blanks can be detected which directly have an influence on the rounding properties, and the resulting measurement value will be given to the control 5 which in particular upon an increase or a decrease of the measured strength in comparison to a set target strength value or value range operates at least actor 23 to adapt the rounding apparatus during operation to the change of the strength of the metal sheet blank. If thus the measured strength value for blank 1 deviates from a target value or target value range and reaches another target value or target value range for which the control has programmed orders for setting the rounding apparatus, the control 5 will operate for this blank 1 actor 23 for the pre-rounding element 14 and if the case may be as well actor 17 for the rounding wedge 13, after the preceding blank 2 has left the rounding rollers 11 and 12, so that the rounding properties of the rounding apparatus are adapted to the strength properties of blank 1, so that the target rounding radius R is attained for blank 1 when this blank is transported through the rounding apparatus and rounded therein. The same procedure is done for the following blank and each of the following blanks, so that an adaptation of the rounding properties during operation is attained, if necessary, for each blank. As an alternative to the product IMPOC® another market-available product 3R-AQC of the company 3R Technics GmbH, Zurich, Switzerland, can be used, that allows as well the touch-less measurement of sheet metal properties without destruction of the sheet metal by generating eddy-currents within the sheet metal by a measurement coil which currents are measured. By this eddy-current measurement and via correlation sheet metal properties such as hardness, tear strength and elastic limit can be measured. But it is preferred that the measurement device 27 is a device that measures directly the tear limit of the sheet metal or its deformation during rounding, respectively, as shown with the measurement device 27 of FIG. 13, which measures with a sensor arrangement different touch points of the blank depending on its rounding properties.

In addition or in lieu of the measurement device 27 or the other measurement devices explained below according to FIG. 14 to 16, a measurement device 39 can be provided which measures the sheet metal thickness of each blank in a manner known to the skilled person. Such sheet metal thickness measuring devices are known and available on the market and are not explained here. The output value of the sheet metal thickness measurement device 39 is fed to the control 5 and is used therein to set at least actor 23 to adapt the rounding apparatus to the sheet metal property "thickness".

With reference to FIGS. 14 to 16 a preferred embodiment for detecting the rounding property of each blank is explained. The measurement device 50 can be arranged within the feeding section 3 as explained for the measurement devices 27 and 39. But it can as well be arranged within the rounding apparatus and is then preferably a part of the flexing station or is arranged therein. So, rollers 28 and 29 of the measurement device 50 may take the place of rollers 8 and 9 of the flexing station or may take the place of rollers in the feeding section 3. The preferred case, since less room is necessary, is that the measurement device is arranged within rounding apparatus 4 and the rollers 40 and 41 are thus the rounding rollers (corresponding to rollers 11 and 12 of the examples explained before) and thus the pre-rounding element 14 or wedge, respectively, is then arranged in front of the rounding rollers 41, 42 as is shown in FIG. 14 in simplified manner by the box 14 only. As well the rounding wedge 13 behind the rounding rollers 41, 42 is shown by a box 13 only. Other arrangements of the measurement device 50 in front of the rounding apparatus or within the rounding apparatus are possible as well. In the shown example the measurement device 50 includes a flexing wedge 37 for the measurement. If the measurement device 50 is thus arranged, as the measurement devices 27, 39, in the feeding section 3, this flexing wedge 37 can be adjusted by control 5 to the same displacement as the flexing wedge 7 in the rounding apparatus. If the measurement device 50 is arranged within the rounding apparatus and in particular within the flexing station, the flexing wedge 37 of the measurement device will take over the function of the flexing wedge 7 of the rounding apparatus according to the examples above, so that the rounding properties are measured with the actual flexing wedge. The measurement device 50 may on the other hand have no flexing wedge at all. The measurement device 50 comprises at least one sensor 45 by which the arrival of the sheet metal blank to be measured at or within the measurement device can be detected. In particular the front edge (seen in transport direction) of the blank is detected, in particular by an optical sensor, for example a light barrier or several light barriers or by an inductive sensor. This detection of the arrival of the blank starts a time measurement by the measurement device. This time measurement can be done by a separate time measuring module or can be done by control 5 which controls in this case the measurement device 50 as well or is part of it. This embodiment is shown in FIG. 14. The time measurement will be stopped, when the front edge of the sheet metal blank hits a measuring plate 38; this is signalled to the control 5 via line 38'. As can be seen in the side view of FIG. 14, the time is different according to the rounding property of the sheet metal blank and thus the measured time is a measurement value indicating the rounding property. By this value the rounding apparatus will then be controlled for the blank as has been explained above. This is shown in FIG. 14 by signal lines 40 which lead from the control 5 to the actors of the rounding apparatus described above. In particular actor 23 of the pre-rounding element 14 is set or controlled, respectively, in this way by the measured rounding property.

The detection that the front edge of the blank has hit the measurement plate 38 of the measurement device 50 is done preferably electrically. This can be done by setting the plate 38 to a first electrical potential and at least one of rollers 28, 29 to a different second electrical potential (which applies as well to flexing wedge 37 if this wedge is present). If the front edge of the electrically conductive sheet metal blank hits plate 38 the two potentials are short cut which is detectable by a corresponding current flow or by a corresponding voltage drop of the measurement voltage. By detecting this event the time measurement is stopped or in other words the time between the detection of the arrival of the front edge by sensor 45 and the detection of the contact of the front edge with sensor plate 38 is taken which is dependent on the rounding property of the sheet metal blank. As can be seen clearly in FIG. 14 a sheet that is less bent by rollers 29, 28 due to its bending properties hits plate 38 nearer to rollers 41, 42 and thus takes more time until the contact can be detected than a blank that is bent with a smaller radius. Thus the rounding properties are detectable by the measured time.

With coated sheet metal blanks the electrical contact between rollers 28, 29 and if the case may be flexing wedge 37 and the sheet metal may be insufficient for a measurement. It is therefore preferred that the measuring plate is provided with a plurality of measuring parts 38a, 38b, 38c, 38d etc. that extend in transport direction and are arranged side by side and are electrically isolated from each other. Adjacent measuring parts are lying on the two different electrical potentials. Thus by a short cut of two measuring parts of different potential by the front edge of the sheet metal blank, which is always uncoated, the contact of the blank with the plate 38 can be detected as well. These measuring parts can have a wedge shape as can be seen in FIGS. 14 and 15. FIG. 15 shows some of the measuring wedges in perspective view. FIG. 16 shows a measurement circuit with a measurement voltage source $U_s$ and where the rollers 28, 29 and the flexing wedge 37 are on ground potential. As well being connected to ground potential are the measuring wedges 38b, 38d etc. (but in FIG. 16 only wedge 38b is shown as a box). Measuring wedges 38a, 38c etc. on the other hand lie on positive potential (in FIG. 16 only wedge 38a is shown as a box). Possible electrical short cuts for the measurement voltage by contact of the blank front edge on the measurement plate 38 are thus the short cut measurement wedge—measurement wedge or measurement wedge—flexing wedge, or measuring wedge—roller. Each of these short cuts will lead to a voltage drop that can be detected and will stop time measurement. Voltage drop measurement is shown in FIG. 16 by voltage meter symbols (a V in a circle).

The method and the apparatus are in particular suited for the rounding and welding of can bodies. The pre-rounding element according to the invention can be mounted to a rounding apparatus instead of the conventional pre-rounding element.

While there are shown and described presently preferred embodiments of the invention, it is to be distinctly understood that the invention is not limited thereto but may be otherwise variously embodied and practiced within the scope of the following claims.

The invention claimed is:

1. A pre-rounding element for a rounding apparatus comprising:
    an essentially rigid upper element part having fixation elements for fixation to one of the rounding apparatus or said upper element part being provided by a fixed part of said rounding apparatus,
    a lower element part being provided for acting on the sheet metal blanks to be rounded,
    a joint or a hinge connecting said upper element part and said lower element part, and
    at least one actuating element,
    wherein said at least one actuating element provides for the controlled displacement of said lower element part of said pre-rounding element such that sheet metal blanks to be rounded are differently pressurized by said lower element part depending on the displacement thereof,
    wherein said joint or said hinge is an elastically deformable solid body, and
    wherein said upper element part and said lower element part are connected by at least one leaf-spring.

2. A pre-rounding element for a rounding apparatus comprising:
    an essentially rigid upper element part having fixation elements for fixation to one of the rounding apparatus or said upper element part being provided by a fixed part of said rounding apparatus,
    a lower element part being provided for acting on the sheet metal blanks to be rounded,
    a joint or a hinge connecting said upper element part and said lower element part, and
    at least one actuating element,
    wherein said at least one actuating element provides for the controlled displacement of said lower element part of said pre-rounding element such that sheet metal blanks to be rounded are differently pressurized by said lower element part depending on the displacement thereof, and
    wherein said joint is a rotating joint with a rotation axle.

3. The pre-rounding element according to claim 2, wherein said lower element part is essentially wedge-shaped.

4. The pre-rounding element according to claim 2, wherein said actuating element is provided for executing an essentially linear movement dependent on an electrical input signal.

5. The pre-rounding element according to claim 2, wherein said joint or said hinge is an elastically deformable solid body.

6. The pre-rounding element according to claim 2, wherein said upper element part and said lower element part are solidly connected as one piece.

7. A rounding apparatus for rounding single sheet metal blanks passing through said apparatus comprising:
    a pre-rounding element comprising an essentially rigid upper element part having fixation elements for fixation to one of the rounding apparatus or said upper element part being provided by a fixed part of said rounding apparatus, a lower element part being provided for acting on the sheet metal blanks to be rounded, a joint or a hinge connecting said upper element part and said lower element part, and at least one actuating element, wherein said actuating element provides for the controlled displacement of said lower element part of said pre-rounding element such that sheet metal blanks to be rounded are differently pressurized by said lower element part depending on the displacement thereof;
    a control for actuating said pre-rounding element based on at least one of an input value, a preset value or a measurement value of a sheet metal property of a single blank to be rounded; and
    a measurement device for measuring the sheet metal property of single sheet metal blanks passing consecutively through said rounding apparatus,
    wherein said control connected to said measurement device for receiving at least one of a measurement value of said sheet metal properties or a value derived from said measurement value, and
    wherein said actuating element of said pre-rounding element is adjustable by said control.

8. The rounding apparatus according to claim 7, further comprising rounding rollers and an adjusting drive for said rounding rollers, said adjusting drive being controllable by said control.

9. The rounding apparatus according to claim 8, further comprising a rounding wedge and an adjusting drive for said rounding wedge, said adjusting drive being controllable by said control.

10. The rounding apparatus according to claim 7, wherein said measurement device comprises an input sensor for detecting a sheet metal blank, a rounding device, a time measurement device and a measurement plate provided to be contacted by a sheet metal blank rounded by said rounding device, and
    wherein said time measurement device measures a time between a signal from said input sensor detecting said blank and a first contact of said rounded blank with said measurement plate.

11. The rounding apparatus according to claim 10 wherein said measurement plate comprises a plurality of elongated measurement pieces laying side by side, and
    wherein each of the elongated measurement pieces is electrically isolated from one other.

12. A welding device for can bodies comprising:
    a Z-rail for positioning the can body edges,
    at least one welding roller, and
    at least one wire electrode, and
    a rounding apparatus according to claim 7.

* * * * *